Feb. 19, 1952    G. KUNETZ    2,586,667
METHOD FOR THE ELECTRICAL INVESTIGATION OF THE GROUND

Filed May 16, 1946

INVENTOR.
GEZA KUNETZ
BY
*Campbell, Brumbaugh, Free & Graves*
HIS ATTORNEYS.

Patented Feb. 19, 1952

2,586,667

UNITED STATES PATENT OFFICE 2,586,667

METHOD FOR THE ELECTRICAL INVESTIGATION OF THE GROUND

Géza Kunetz, Issy-les-Moulineaux, France, assignor to Compagnie Generale de Geophysique, Latour Maubourg, Paris, France, a French corporation Application May 16, 1946, Serial No. 670,101
In France February 27, 1946

2 Claims. (Cl. 175—182)

1

The present invention has for its object improvements in the investigation of ground as obtained by studying the electric fields and currents existing in a spontaneous manner in the ground, such as telluric or earth currents, industrial currents and the like with the exclusion of any artificial fields.

Numerous methods already exist for the electrical investigation of the ground by the study of earth currents; such methods have already been disclosed in particular in the United States Patents No. 2,034,447 issued March 17, 1936, for Method for Electrically Prospecting the Undersoil and No. 2,240,520 issued May 6, 1941, for Method and Apparatus for Electrical Underground Prospecting.

These methods have for their object to define at all points of the ground being investigated the direction and magnitude of the natural electrical or earth current field coresponding to an earth current field of unit magnitude and of given direction at a predetermined base point B. This being ascertained, it is possible to establish in the district to be investigated the map of the potentials or the map of the electric field or again the map of the current lines corresponding to a sheet of earth currents of predetermined directions. Examination of these maps allows as described in the above mentioned patent specifications the drawing of interesting conclusions as to the structure of the ground capable of producing such electrical phenomena.

These prior methods provide very satisfactory results in the comparatively frequent case where the mean direction chosen for the direction of the sheet of earth currents from which the map of potential or field or current lines is drawn, is very near the direction which is perpendicular to the tectonic direction of the district which is being studied: in this case the earth current shows considerable variations in intensity when it passes perpendicularly through the structural accidents such as an anticlinal. In the case of a cylindrical structure, the measures of current executed on the contrary, in directions parallel with the generating lines of the structure would show a uniform field and no anomaly could be brought to light. Now it is often impossible, chiefly if the work is executed in a district, which is still unknown from a geological standpoint, to ascertain beforehand the direction of the field which can be chosen to make the accidents of the ground appear. Better still, if the tectonic structure is somewhat complex, which is generally the case, and if the axes of the folds show marked deflections, a given direction of the field which is very suitable for the study of a given part of the folds may be but ill suited for the study of the remainder and the maps obtained thereby are of unequal interest according to the districts to which they refer.

The object of the present invention consists in removing these drawbacks and allows in all cases the study of the earth currents to provide all the data it is possible to draw therefrom as concerns the tectonic structure of the ground of whatever complexity it may be.

The present invention relies on the following facts discovered by the applicant:

It is possible to define through a limited number of measures the value and the direction of the earth field at all the points at which the measures have been made, not only for a given direction of the earth field at the base station, but for all directions of the field at said station.

The relation of the values of the earth current in all directions between a given point and a base station may be completely characterized by a reduced number of characteristic data which may in their turn be reduced to a single value.

Under such conditions the invention will consist in firstly executing at the different stations a sufficient number of measures for defining the complete system of the values of the earth fields characterizing said stations with regard to the base and drawing from these values the data of the single final value characterizing the earth fields at the points or stations chosen (as will be shown later, the choice of the base has no influence on the relative values of the last named characteristic datum at the various stations). This being done, a map can be executed in accordance with the above data which allows thus drawing extremely interesting conclusions as to the constitution of the ground.

The invention may be better understood from the following detailed description taken in conjunction with the accompanying drawings in which.

Figure 1:
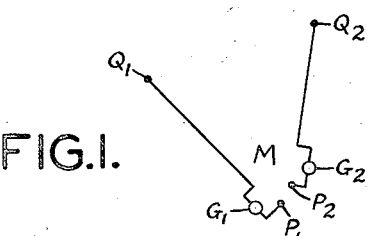
Fig. 1 is a schematic diagram of a measuring system located at a measuring station in accordance with the invention.
Figure 2:
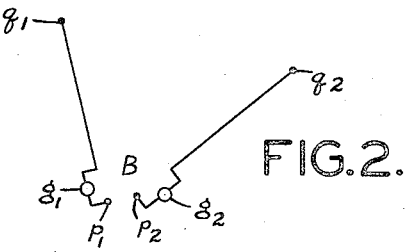
Fig. 2 illustrates schematically a measuring system at a base station.

The experimental comparison of the variation of the earth field at a given point with the variations of the earth field at the base station B, as executed by the applicant, shows as a matter of fact that, at least as an average, the earth field at the measuring station is a linear function of the earth field at the base station.

Supposing (Figs. 3 and 4) two points M and B at the surface of the earth are separated, for instance, by several tens of kilometers and at each of said points two pairs of electrodes, respectively, P1—Q1 and P2—Q2, p1—q1 and p2—q2 are arranged, the electrodes being interconnected by means of a cable and a measuring instrument as illustrated; this measuring instrument allows the continuous recording of the variations in the drop of potential produced by the telluric currents between the electrodes of each pair. Thus, the recording of the deflections of the galvanometer G1 will indicate the modifications of the drop in potential between P1 and Q1 and so on. We will designate by X the variation, between two moments chosen at will, of the drop in potential between P1 and Q1 divided by the distance P1—Q1, and by $Y, x, y$, similar variations during the same period of time of amounts defined in the same manner and relating to the three other pairs of electrodes.

Through their very definition $X, Y, x, y$ are the simultaneous modifications of the projections of the average field of the telluric currents between the couples of points P1 Q1—P2 Q2—p1 q1—p2 q2 on the directions defined by said couples.

Experience shows now that any of said projections, say X at M, is a linear combination of the two simultaneous projections $x$ and $y$ at B which combination has coefficients independent of the time interval selected. It is, therefore, possible to write out the equations $$X = ax + by$$
$$Y = cx + dy \quad (1)$$

the coefficients $a$-$b$-$c$-$d$ remaining the same whatever may be the simultaneous variations chosen.

This experimental equation binding the variations of the telluric fields may furthermore be explained theoretically upon the assumption that the telluric currents are equivalent to currents produced beween two electrodes that are at an infinite distance from one another (at least in practice as said distance may be equal to several hundreds of kilometers) and with the application to the telluric fields of the law of superposition of fields applicable to all electric fields. Whatever may be the value of said assumption and said theoretical considerations, the relationship (1) shows that if suitable measurements enable the four constant coefficients $a$-$b$-$c$-$d$ to be ascertained, it is possible to find in an univocal manner the direction and intensity of the field at M corresponding to a field of any direction and intensity at B.

The coefficients $a$-$b$-$c$-$d$ thus provide a representation of the electric properties of the point M with reference to those of the point B and they show these properties not only in a particular direction but in all directions.

The physical meaning of said coefficients is, however, difficult to define as said coefficients depend not only on the points M and B but also on the axes of projection selected. However, if the axes are parallel two by two, it will be readily ascertained that the coefficients $b$-$c$ give the rotation of the field between the two points whereas the coefficients $a$-$d$ are related to the variations in its intensity.

As a matter of fact, the actual physical data underlying the relationship between the simultaneous fields at two points should be independent of the axes of projection selected. They will thus be constituted by certain combinations of the coefficients $a$-$b$-$c$-$d$, which combinations are invariants with reference to a change in direction of the axes.

It has been found, in accordance with my invention, that the most important physical element in this relationship is constituted by the ratio between the area swept by the telluric field vector at the measuring station and the area swept by the field vector at the basic station during the same time interval. I will designate this parameter hereinafter by the term "area."

Experience shows, as a matter of fact, that a map on which lines are recorded along which said parameter has a constant value will provide indications as to the structure of the subsoil.

It can be shown very easily that the above area A is equal to the amount $$ad - bc$$

which is the determinant of the coefficients of the relationship (1) written out hereinabove and forms an invariant with reference to any change in the axes of projection. This coefficient combination appears, in accordance with my invention, as the invariant that is by far the most important one for defining the characteristics of the subsoil through a study of the telluric fields.

In practice, the value of the parameter A may be obtained easily in various manners; in particular the measure of this parameter may be executed as follows:

(a) If as described in the United States Patent No. 2,240,520 the variations are recorded directly as to magnitude and direction of the earth current at the base station on a polar diagram, it is sufficient to measure directly the ratio between the areas of the two polar diagrams, provided these diagrams are recorded during a sufficiently long time.

As a matter of fact and in accordance with the invention, these are executed preferably several successive recordings of a limited duration, say five minutes each for instance.

(b) If the variations of the earth currents are simply recorded at both stations along two given directions perpendicular to one another, it is possible to operate as follows as illustrated in accompanying drawings, in which:

On each of the diagrams B and M are recorded the variations of the telluric fields in two mutually perpendicular directions. The recording executed in one direction is represented in solid lines and that along a perpendicular direction in dotted lines. In said records, the abscissae are proportional to time and the ordinates to the drop in potential between the ends of the different lines.

The recording includes, furthermore, an arrangement for defining time and constituted, for instance, by the periodical photograph made of the dial of a watch as illustrated in the drawing. This allows ascertaining simultaneous moments on documents recorded at distant points. It is not necessary, however, to record times since, as is apparent from the example shown, it is generally easy to find these simultaneous moments through the sudden variations appearing in the telluric field, which correspond very clearly on the two diagrams and would appear on a polar diagram under the form of singular points such as sudden deflections and the like.

Thus, in the example illustrated, it is easy to find on the two recordings of the diagram M sudden variations corresponding to the black points at M1, M2, M3, M4, to hich variations correspond obviously similar variations B1, B2, B3, B4, on the diagram B.

Figure 3:
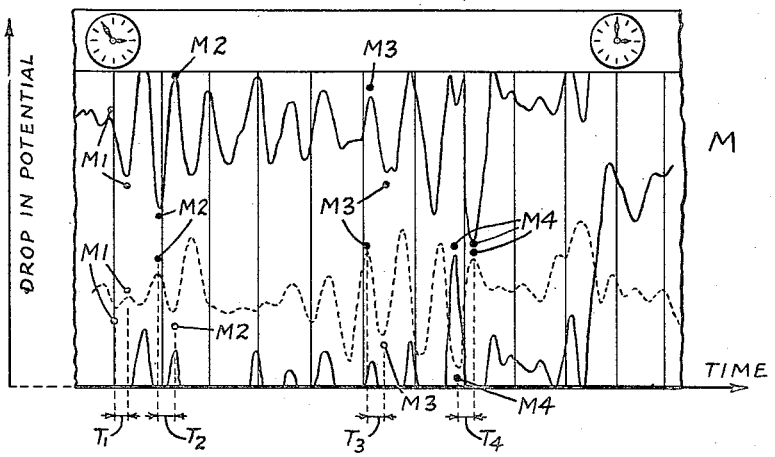
Figs. 3 and 4 illustrate typical curves of potential drop versus time for the measuring station and base station, respectively, shown in Figs. 1 and 2, respectively.
Figure 4:
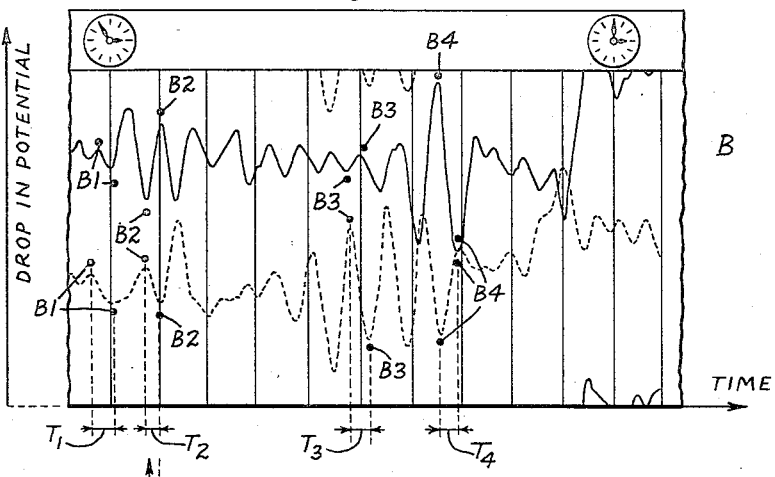

Consequently, the method according to my invention for ascertaining the parameters $a$-$b$-$c$-$d$ or their combination is as follows:

(a) A certain number of simultaneous time intervals are defined on the two records, say the intervals T1, T2, T3, T4 of Figs. 3 and 4.

(b) For each of the recorded curves, the difference in ordinates at the beginning and end of each time interval is measured. Thus, the difference in ordinates between the beginning and end of the time interval T1 for the solid curve in Fig. 4 gives the value of X1. In similar fashion, corresponding values for Y1, $x1$ and $y1$, may be obtained from the dotted curve in Fig. 3, the solid curve in Fig. 4 and the dotted curve in Fig. 4, respectively. Proceeding in this fashion for all of the time intervals defined on the four recorded curves provides a plurality of systems of values of the components of the telluric fields that I have designated hereinabove by the letters X-Y-$x$-$y$, to wit: X1-Y1-$x1$-$y1$ for the time interval T1, X2-Y2-$x2$-$y2$ for the time interval T2 and so on.

(c) The values thus obtained being bound by the two equations (1) it is sufficient, in theory, to measure, thus, the components of the variations of the field X-Y-$x$- and $y$ corresponding to two time intervals such as T1—T2 for obtaining the four equations required for defining the four parameters $a$-$b$-$c$-$d$.

(d) In particular, for defining the so-called "area" parameter defined hereinabove, if the two-vectors V1 having as components X1 and Y1, and V2 having as components X2 and Y2, and the two vectors $v1$ and $v2$ having, respectively, as components $x1$-$y1$ and $x2$-$y2$, the area will be equal to the ratio between the vectorial product of V1 and V2 and the vectorial product of $v1$ and $v2$. In other words, it will be equal to the ratio between the surface of the parallelogram having for its sides V1 and V2 and the surface of the parallelogram having for its sides $v1$ and $v2$.

(e) In practice, as physical measurements are always tainted with errors and as, furthermore, the relationship (1) is not perfectly correct but is exact only as an average, it is necessary, in order to ascertain the characteristic parameters with sufficient accuracy, to measure a more or less considerable number of couples of vectors and to obtain therefrom through the usual methods of caculation applied in such cases the most probable value of these parameters, chiefly that of the area.

It is also possible to obtain an equivalent result through graphical means according to the invention by proceeding as follows:

(f) The components of a number of telluric field vectors are defined as disclosed at $a$ and $b$ hereinabove, said components corresponding to various time intervals considered simultaneously at the measuring station M and at the basic station B.

Figure 5:
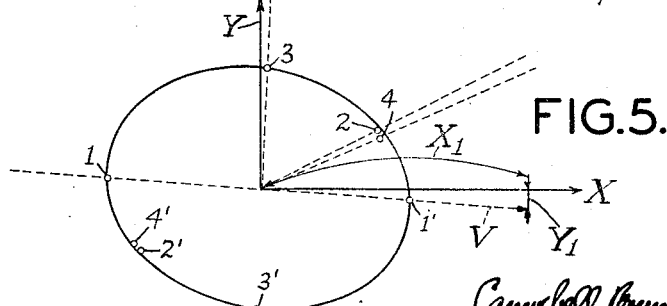
Fig. 5 illustrates a representative curve that may be derived from the curves shown in Figs. 3 and 4 and from which the area determinants may be ascertained.

(g) The vectors that correspond to the different time intervals considered are drawn from a common starting point; for instance, V1 is drawn by setting X1 as an abscissa and Y1 as an ordinate, as disclosed in Fig. 5 and the other vectors at the station M are drawn in a similar manner.

(h) The simultaneous vectors at the basic station B are similarly drawn on a separate diagram or else their lengths are defined through calculation.

(i) The ratio between the lengths of the simultaneous vectors at the measuring station and at the basic station is calculated to provide the fractions V1/$v1$ V2/$v2$ etc., and lengths proportional to said fractions are laid over the direction of the vectors V1, V2, etc., to either side of the common origin so as to obtain the points 1-2-3-4 and 1'-2'-3'-4' of Fig. 5.

(j) It is found from inspection of said diagram, and experience confirms the fact in all cases, that said points are situated at least approximately on an ellipse. This experimental phenomenon may be explained through the form of the Equation 1, the projective character of which causes the end of the field vector at the measuring station to describe an ellipse when the end of the simultaneous field vector at the basic station describes a circle. Now, taking as the lengths of the field vectors at the basic station as a unit, as disclosed at (i), corresponds exactly to considering the ends of last mentioned vectors as moving over a circle. The ratio between the area of the ellipse at the measuring station and the area of the circle at the basic station will be equal to the area parameter and consequently:

(k) The product of the half-axes of the ellipse obtained as mentioned at (j) being provided, this product will be equal to the area parameter, taking into account the unit of length that has been adopted.

Thus, whatever method has been used, there is obtained at each point M forming a measuring station the value of the telluric area A with reference to a stationary point B forming a basic station. The area at said point B with reference to another basic station B' being, for instance, equal to A', it is possible to show that, in accordance with the very definition of the invariant A, the area at M with reference to B' is equal to A×A'. The change of basic station corresponds thus to a mere change of unit. The so-called area maps of a same zone executed with reference to various basic stations are obtained thus with reference to one another through a mere change of unit and are consequently superposable.

The area determinant deriving from the geologic structure of the ground and being independent of the direction for which the measures are made, the map of areas illustrates with much greater truth than any element bound to a direction the very structure of the ground. Its geological interpretation is particularly easy and trustworthy. Thus, in particular, in the case of a ground concealing an anticlinal covered by homogeneous conductive material, a map giving out the lines of equal areas would correspond in a substantially accurate manner with a map giving out the isobathic lines of the structure.

What I claim is:

1. An electrical prospection method utilizing the effects of earth or industrial telluric currents, without the necessity for using any artificial current, comprising the steps of recording variations in a function of the telluric field between first two spaced apart points at one station, recording variations in a function of the telluric field between two other spaced apart points at said one station, said two other points lying on a line substantially perpendicular to a line passing through said first two spaced apart points, recording variations in a function of the telluric field at first two spaced apart points at another station, recording variations of a function of said telluric field at two other spaced apart points at said another station, said last named spaced apart points being located on a line lying substantially perpendicular to a line passing through said another station first two spaced apart points, all of said records being made during the same period of time, designating a plurality of identical time intervals on each of said records, measuring for the beginning and end of each said time interval, the values of the ordinates representing the respective recorded functions of the telluric field, determining the differences between said ordinates corresponding to the beginning and end of each said time interval, the two ordinate difference values obtained for each station during each time interval corresponding to vector components of a function of the telluric field, determining from said vector components a vector resultant for each station during each time interval, and determining from said vector resultants the ratio between the area swept by the telluric field resultant vector at said one station and the area swept by the telluric field resultant vector at said another station during the same time interval.

2. An electrical prospection method utilizing the effects of earth or industrial telluric currents, without the necessity for using any artificial current, comprising the steps of recording variations in a function of the telluric field between first two spaced apart points at one station, recording variations in a function of the telluric field between two other spaced apart points at said one station, said two other points lying on a line substantially perpendicular to a line passing through said first two spaced apart points, recording variations in a function of the telluric field at first two spaced apart points at another station, recording variations of a function of said telluric field at two other spaced apart points at said another station, said last named spaced apart points being located on a line lying substantially perpendicular to a line passing through said another station first two spaced apart points, all of said records being made during the same period of time, designating a plurality of identical time intervals on each of said records, measuring for the beginning and end of each said time interval, the values of the ordinates representing the respective recorded functions of the telluric field, determining the differences between said ordinates corresponding to the beginning and end of each said time interval, the two ordinate difference values obtained for each station during each time interval corresponding to vector components of a function of the telluric field, plotting from a common origin a first plurality of said resultant vectors representing functions of telluric currents at said one station and corresponding to said time intervals, plotting from another common origin a second plurality of said resultant vectors representing functions of telluric currents at said another station and corresponding to the same time intervals as said first plurality of plotted vectors, determining the ratio between the magnitude of each vector of said first plurality and the magnitude of the corresponding vector of said second plurality, respectively, plotting each of said ratios along the corresponding plotted vector of said first plurality, the ends of said ratio plots lying along an ellipse, and determining the area of said ellipse.

GÉZA KUNETZ.

REFERENCES CITED

The following references are of record in the file of this patent:

UNITED STATES PATENTS

| Number | Name | Date |
|---|---|---|
| 2,034,447 | Schlumberger | Mar. 17, 1936 |
| 2,240,520 | Schlumberger | May 6, 1941 |